Nov. 1, 1966  H. E. HINTERMANN ETAL  3,282,737
ELECTRODES AND ELECTRODE MATERIAL
Filed Aug. 27, 1962  3 Sheets-Sheet 1

3,282,737
ELECTRODES AND ELECTRODE MATERIAL
Hans E. Hintermann, Yardley, Pa., and Madison W. Reed, Jr., Irving, Tex., assignors to The Electric Storage Battery Company, a corporation of New Jersey
Filed Aug. 27, 1962, Ser. No. 219,504
20 Claims. (Cl. 136—120)

The present invention generally relates to electrodes for the direct production of electrical energy from fuels by electrochemical means. More specifically, the present invention is concerned with a new and improved method for catalytically activating material for the production of fuel cell electrodes which are characterized by a high degree of catalytic activity and economy of production.

The extent and character of the surface presented at the reaction site by the catalytic materials in a fuel cell electrode is an important factor in controlling electrode performance. In addition, the electrical conductivity of the electrode and the ability of the electrode to withstand corrosive environments are other factors influencing electrode performance. For applications where a gas is introduced in counter-current opposition to the direction of electrolyte penetration, uniformity of electrode structure, particularly with respect to pore size and distribution, is also of the greatest importance. In this respect, the most efficient electrode structure is one in which all the pores are of substantially the same diameter in order that the back pressure of the gas and the capillary pressure of the electrolyte will be in balance in each pore, assuring a maximum catalyst-fuel-electrolyte interface. One means of providing electrodes having the characteristics described is the utilization of finely divided particles of the desired catalytic materials molded or otherwise shaped into the desired electrode configuration and structuralized by means of sintering. While electrodes of sintered catalytically active material perform well, they have proven to be economically unfeasible due to the high cost of most of the catalytically active materials which are generally noble metals. The economic unfeasibility of such electrodes can in part be attributed to the inefficient utilization of the catalytic material. Since the electrode reaction takes place only at the catalyst-fuel-electrolyte interface, it is a surface reaction and hence much of the mass of catalyst is inactive, serving only as an electrical conductor.

It is a specific object of the present invention to provide means for assuring the most efficient utilization of catalytically active material in a fuel cell electrode, thereby reducing to a minimum the amount of such material which must be present to assure satisfactory electrode performance.

It is another object of the present invention to provide electrode material in which the catalyst is present in a physical state of high free surface energy.

In accordance with the present invention, catalytically active conductive materials suitable for fabrication into electrodes particularly adapted for fuel cell applications are provided by depositing dual coatings of catalytically active metals on finely divided metallic substrates, finely divided non-metallic substrates having metallic coatings thereon, or microporous non-metallic substrates having metallic coatings thereon. Each one of the dual coatings is applied by a specific deposition technique chosen to give the electrode material high catalytic efficiency and to permit the most economic utilization of the catalyst. The specific coating techniques utilized are those of chemical displacement and chemical reduction. A chemical displacement process produces a uniform catalyst coating more or less evenly distributed over the entire substrate particle. A chemical reduction process results in a catalyst coating which tends to build up at the sites on the substrate of highest surface free energy resulting in a non-uniform distribution of the catalyst. The coating produced by a chemical reduction process, however, has a high degree of catalytic activity, higher than that produced by a chemical displacement process due to a higher number of active sites and lattice defects. Thus, in accordance with the present invention, a chemical displacement process is used to deposit as a first layer a portion of the total catalyst desired on the substrate. This produces on the substrate a thin film of catalyst material finely and homogeneously distributed over the particle surface creating a large number of centers or nuclei for a second deposit of the catalyst by a chemical reduction process. In this manner there is provided a good base for the second layer of highly active catalyst which is deposited by chemical reduction.

While not limited thereto, coated finely divided particles in accordance with the present invention are particularly adapted for fabrication into fuel cell electrodes by means of sintering. When such particles are sintered, however, it has been found that in some cases the catalytic activity of the chemically reduced coating is slightly lowered by the sintering operation. Accordingly, it should be understood that it is within the scope of the present invention that particles be sintered after the application of the first catalytic layer by the chemical displacement process, and that the second catalytic layer be applied by a chemical reduction technique to the porous sintered electrode after sintering as a post activation.

Further, in accordance with the present invention, it has been found that it is preferred to have 65%–25% of the total catalyst deposited by a chemical reduction process. Optimum performance is obtained when about 50% of the total catalyst is applied by a chemical displacement technique and 50% by a chemical reduction technique. The minimum amount of total catalyst deposited on a substrate to produce electrodes having acceptable performance characteristics has been found to vary with the particular catalyst involved. Moreover, it is not necessary that both layers of deposited catalyst be of the same catalyst metal. In this respect it should be noted that when a chemical displacement technique is specified, such a technique is one in which the chemical reaction involved is such that the deposited catalyst displaces or is substituted for the substrate metal. In other words, the substrate metal or metal coating is acting as a reducing agent. When a chemical reduction technique is specified, the reaction is such that the substrate on which the catalyst is being deposited is quasi-inert and an external reducing agent is employed to precipitate the catalysts rapidly on the quasi-inert substrate. Still further, the substrate material to be coated must be inert in the electrolyte in which the electrode to be fabricated is to be used. In addition, the metallic substrate or the metallic substrate coating must be less noble than the metallic catalyst to be deposited thereon in order to coat the substrate by a chemical displacement technique.

A better understanding of the present invention may be had from the following detailed description thereof when read with reference to the accompanying drawings of which:

Figure 3:
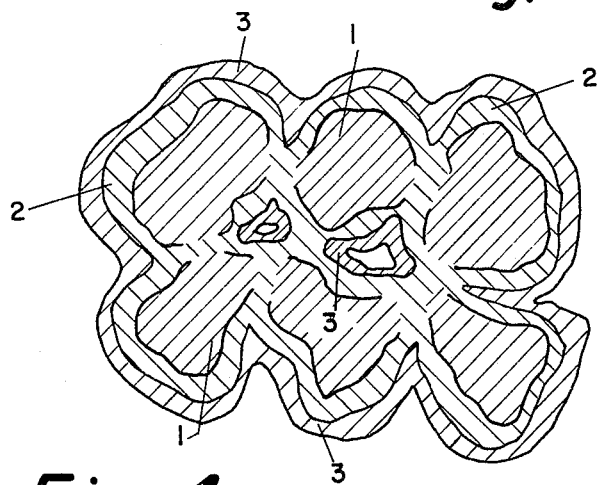
Figure 4:
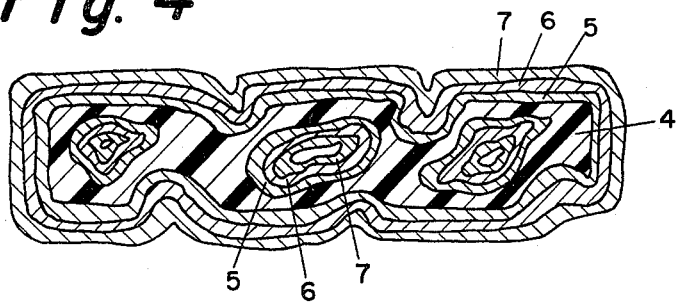
Figure 5:
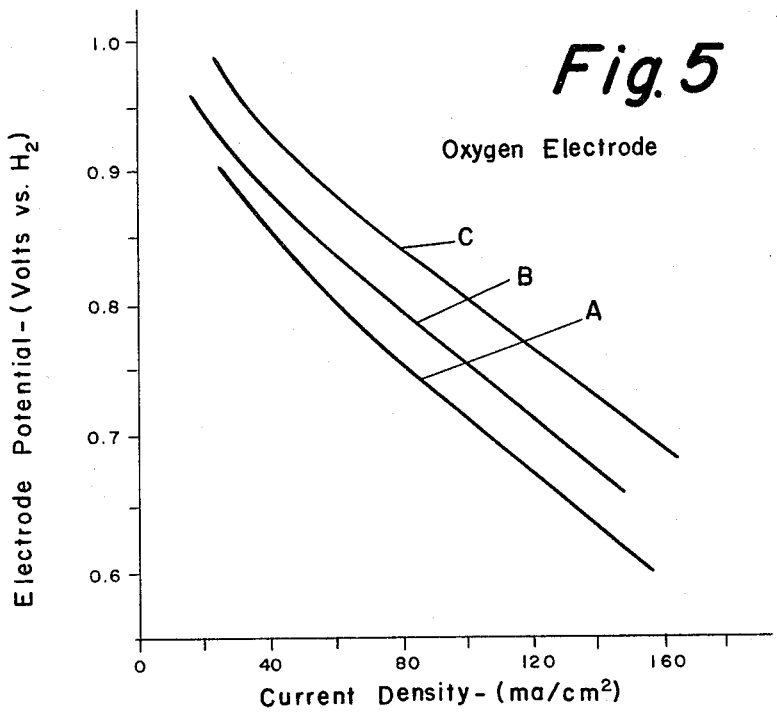
Figure 6:
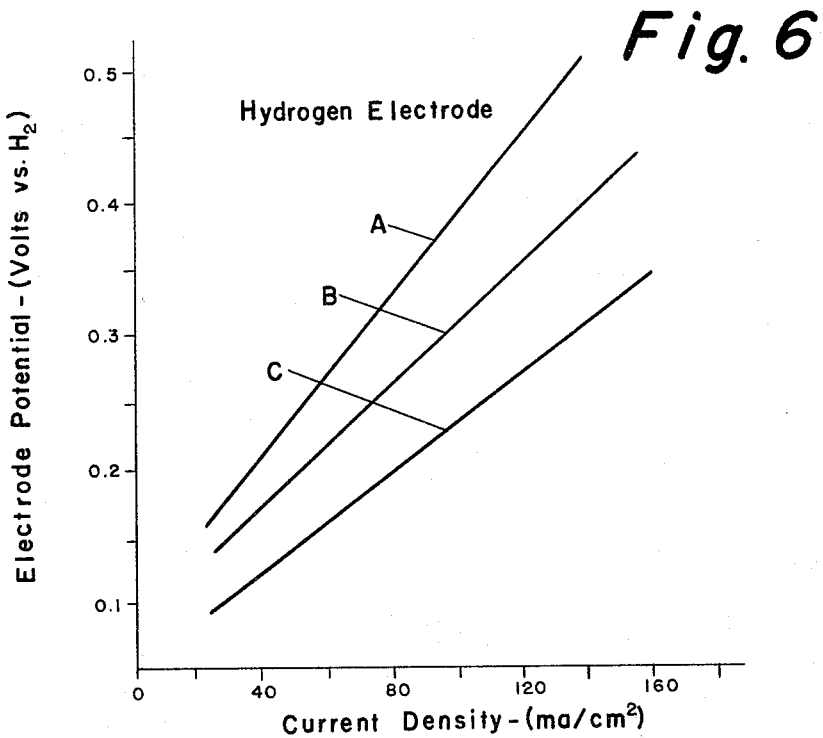
Figure 7:
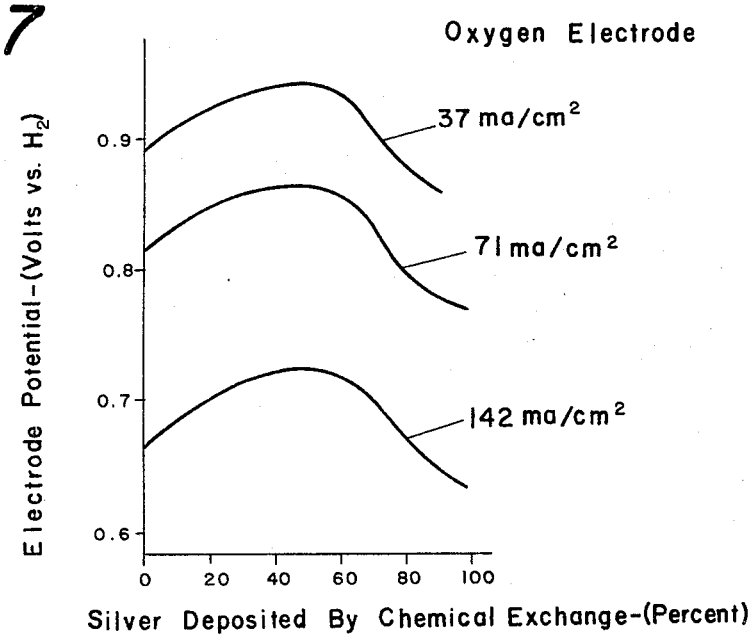
Figure 8:
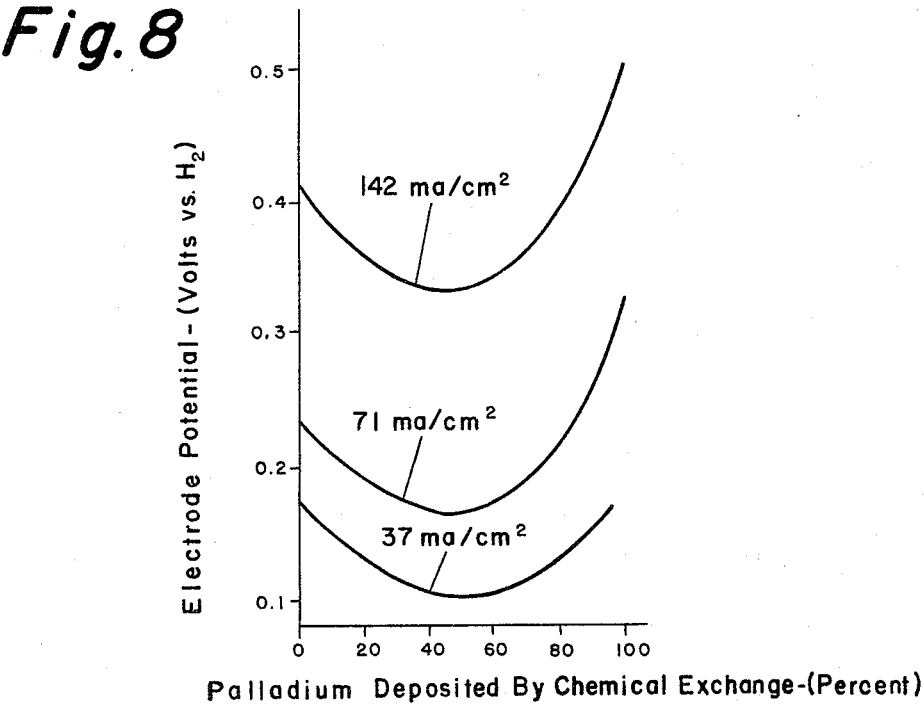

FIG. 3 is a diagrammatic illustration on a greatly enlarged scale of a cross-section of a porous sintered body having a catalytic coating applied in accordance with the present invention wherein the particles are sintered after the application of the first catalytic deposit by a chemical displacement technique and the second catalytic deposit is applied by a chemical reduction technique following the sintering operation;

FIG. 4 is a diagrammatic illustration on a greatly enlarged scale of a cross-section of a fragment of a microporous non-conductive substrate having catalytic coatings applied in accordance with the teachings of the present invention to a metallic coating on the substrate less noble than the first layer of deposited catalyst;

FIG. 5 is a graph illustrating performance characteristics of sintered oxygen fuel cell electrodes having catalytic coatings applied thereto by various processes including the process of the present invention;

FIG. 6 is a graph illustrating performance characteristics of sintered hydrogen fuel cell electrodes having catalytic coatings applied thereto by various processes including the process of the present invention;

FIG. 7 is a graph showing curves illustrative of sintered oxygen fuel cell electrode performances at selected current densities with electrode potential plotted as a function of the percentage of catalytic material applied by the chemical displacement technique with the remainder of the catalytic material deposited by the chemical reduction technique; and FIG. 8 is a graph showing curves illustrative of sintered hydrogen fuel cell electrode performances at selected current densities with electrode potential plotted as a function of the percentage of catalytic material applied by the chemical displacement technique with the remainder of the catalytic material deposited by the chemical reduction technique.

Figure 1:
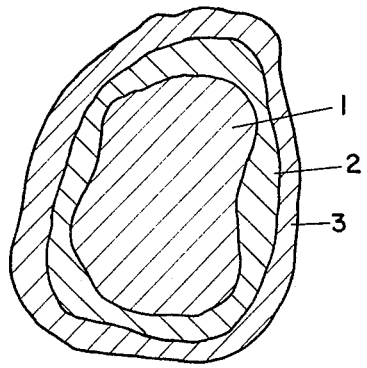
FIG. 1 is a diagrammatic illustration on a greatly enlarged scale of a cross-section of a coated particle in accordance with the present invention wherein the substrate is a metallic particle.

Referring now to FIG. 1, the numeral 1 indicates a metallic particle or substrate having deposited thereon a first layer or coating of catalyst 2 and on that layer a second coating or layer of catalyst 3. While for diagrammatic purposes the catalyst coating layers 2 and 3 have been shown as having substantial thickness, it should be understood that in practice, the coatings on the particles are extremely thin and for substrate particles in the micron range may be in the order of 10 to 100 angstroms calculated on the basis of the deposited amount of catalyst material per unit area and assumed normal density of the bulk material. In accordance with the present invention the coating 2 is deposited by a chemical displacement technique and the coating 3 by a chemical reduction technique. While the coatings 2 and 3 have been shown as completely masking the substrate particle 1 it should be noted that coatings deposited in accordance with the teachings of the present invention may be porous and, hence, it is necessary that the metallic substrate be inert in the electrolyte in which the electrode to be fabricated is to be used. In this respect, if the electrode to be fabricated from the dual coated particles is to be used in an alkaline medium the following are examples of some metals which have been found suitable for use as substrate particles—nickel, silver, copper, and cobalt. It should be pointed out, however, that a copper substrate has generally been found applicable only for fabrication into negative electrodes.

Figure 2:
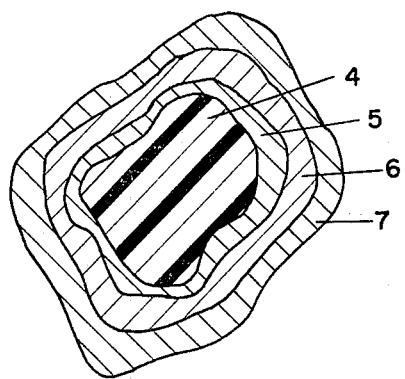
FIG. 2 is a diagrammatic illustration on a greatly enlarged scale of a cross-section of a coated particle in accordance with the present invention wherein the substrate is a non-metallic particle provided with a metallic coating less noble than the first layer of deposited catalyst.

As pointed out hereinbefore, it is not necessary that the finely divided substrate material be metallic provided that it is inert in the electrolyte and has thereon a non-corrosive metallic coating which, with the catalytic coating, will provide the particles with conductivity. Referring now to FIG. 2, the numeral 4 indicates a non-metallic substrate having thereon a metallic coating 5. In accordance with the present invention there is then deposited on this metallic coated substrate a first layer of catalyst 6, deposited by a chemical displacement technique, and a second or outer layer of catalyst 7, deposited by a chemical reduction techinque. By way of illustration and not by way of limitation the following types of materials have been found suitable for utilization as the non-metallic substrates as shown in FIG. 4—carbon, polyethylene, polyvinyl chloride, and finely divided inert and coatable plastics in general, glass, electrolyte insoluble oxides such as alumina, and silica, the latter for acid electrolytes only. The method of applying the base coat 5 to a non-metallic substrate is not within the scope of the present invention and any suitable technique such as chemical reduction, thermal decomposition, vacuum evaporation, or cathode sputtering may be employed. A typical example of such a process would be the carbonyl deposition process for depositing nickel, which has proven to be particularly adapted for the purposes of the present invention.

As noted hereinbefore, the catalytic activity of certain chemically reduced coatings may be reduced during the sintering operation and, hence, it may be desirable to apply the second of chemically reduced layer of catalyst material after the pre-coated particles are sintered. A fragmentary view of such a porous sintered structure is illustrated in FIG. 3. For the sake of clarity reference characteristics similar to those employed in FIG. 1 have been used to designate the substrate particles and catalytic layers in this figure. Referring now to FIG. 3, it should be noted that the sintered bond between the coated substrate particles may take place as a result of the surface sintering not only of the first catalytic layer 2, but also a sintering of the substrate particles themselves. The extent of this will depend of course, upon the conditions of the sintering operation. Following the sintering operation, the second coating of catalyst is deposited on the porous sintered matrix by means of a chemical reduction technique as will be discussed in greater detail hereinafter.

Referring now to FIG. 4, there is shown a cross-sectional view of a piece of microporous plastic substrate having deposited thereon dual coatings in accordance with the teachings of the present invention. For the sake of clarity, reference characters similar to those employed in FIG. 2 have been used to designate the plastic substrate 4, the conductive metallic coating 5, the first layer of catalyst 6, deposited by the chemical displacement technique, and the second layer of catalyst 7, deposited by a chemical reduction technique. The fabrication of a microporous substrate such as the one illustrated in FIG. 4 would be in accordance with the same procedures utilized to coat the particles of FIG. 2. In this respect, it should be noted that microporous plastic subtrates such as the one illustrated in this figure when catalyzed with dual coatings in accordance with the teachings of the present invention, make excellent lightweight, inexpensive fuel cell electrodes.

Since chemical displacement coating techniques are only applicable for coating metals less noble than the coating to be applied, it is necessary that the metallic substrate or the metallic substrate coating be, in addition, less noble than the metal of the catalyst layers 2 and 6 of FIGURES 1 and 2 respectively. In the reaction of the chemical displacement technique the substrate metal reacts as a reducing agent with a solution of the more noble catalyst metal, the catalyst metal replacing the substrate metal on the surface of the substrate particle. By way of illustartion, and not of limitation, the following equations are typical of the chemical reactions utilized to deposit coatings by this method:

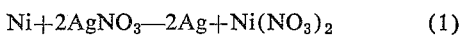
$$Ni + 2AgNO_3 \rightarrow 2Ag + Ni(NO_3)_2 \qquad (1)$$

$$Ni + PdCl_2 \rightarrow Pd + NiCl_2 \qquad (2)$$

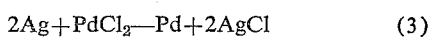
$$2Ag + PdCl_2 \rightarrow Pd + 2AgCl \qquad (3)$$

Some of these reactions are sluggish at ambient temperatures and are generally promoted by heating. In the reactions represented by the Equations 1–3, the substrate particles are nickel, nickel, and silver respectively and the catalytic deposits are silver in Equation 1 and palladium in Equations 2 and 3. The teachings of the present invention are by no means limited to these particular substrate materials or to the metallic catalysts or substrate coatings. However, inasmuch as silver is the principal catalyst utilized in oxygen-consuming fuel cell electrodes, and palladium the principal catalyst utilized in hydrogen-consuming electrodes, these two materials are of particular interest in alkaline electrolytes. It should be understood, however, that nickel may be plated on suitable substrates and the other metals of the platinum group (ruthenium, rhodium, osmium, iridium, platinum) as well as gold may be deposited on substrates of less noble metals.

By way of specific examples of the deposition by a chemical displacement technique of a catalytic coating on a metallic substrate, silver was deposited on a nickel substrate utilizing 80 grams of finely divided nickel powder having an average diameter of 3 microns. This nickel was made into a slurry with 665 ml. of silver nitrate (2 g. $AgNO_3$/100 ml. $H_2O$). The silver nitrate in the sample weighed 13.3 grams with 8.45 grams being available as silver. The slurry was stirred and heated at 80° C. for 8 hours. The coated powder was filtered and washed with distilled water. This resulted in the deposition of 8.45 grams of silver on the nickel particles and 2.3 grams of nickel were taken into solution by exchange as $Ni(NO_3)_2$. Thus, 77.7 grams of nickel were coated with 8.45 grams of silver giving 86.15 grams of silver coated nickel powder having a composition of 9.8% silver and 90.2% nickel. As will be recognized by those skilled in the art, other catalyst metals may be applied in a similar manner by chemical displacement reactions. It should be noted, however, that the weight of the substrate is always decreased by the amount that is displaced by the catalyst metal, but the particle weight is increased by the catalyst coatings.

By way of example of another chemical displacement reaction, the same type of nickel powder discussed above was coated with a first catalytic layer of palladium by means of a chemical displacement technique in which a palladium chloride ($PdCl_2$) solution was prepared by dissolving 0.5 gram of palladium chloride in 299 ml. of water. One ml. of hydrochloric acid was added to the solution to promote the solubility of palladium chloride. The palladium chloride contains 60% of palladium by weight, therefore 0.3 gram of palladium is available for exchange. Thirty grams of nickel powder were made into a slurry with the 300 ml. of palladium chloride solution. This reaction proceeded rapidly in a matter of minutes at ambient temperature.

The coated powder was filtered and washed with distilled water with 0.16 gram of nickel going into solution as nickel chloride ($NiCl_2$) during the displacement reaction, yielding a palladium coated nickel powder composed of 29.84 grams of nickel and 0.3 gram of palladium (0.995% palladium, the balance nickel). Palladium has been chosen here for typical examples of catalyst coatings because the former has been found particularly catalytically active for utilization in electrodes consuming hydrogen gas and hydrocarbons in general and silver has been found to be particularly advantageous in promoting the electrochemical reaction which takes place at the oxygen electrode of a fuel cell.

Following the deposition of a first layer of catalyst on a substrate, a second layer of catalyst is then deposited thereon in accordance with the present invention by a chemical reduction technique. Such a second coating of catalytically active metals can be deposited on the coated powder or sintered porous substrate material by means of chemical reduction of the catalyst metals from their respective salt or complex salt solutions. A number of common reducing agents such as hypophosphorous acid, formaldehyde, oxalic acid, phosphorous, and hydrazine have been used to reduce catalytic coatings from different solutions containing catalyst salts. A specific example of such a reduction technique is the Brashear process for depositing silver. In this process the thickness of the coating depends upon the amount of silver salt reduced, the surface condition of the substrate, and the throwing power of the electrolyte.

By way of example, finely divided nickel powder having a predeposition thereon of silver by a chemical displacement technique, was coated with a second layer of highly catalytically active chemically reduced silver by a process in which 1,010 grams of finely divided nickel powder pre-coated with silver in accordance with the chemical displacement technique described hereinbefore, is coated using a silvering solution prepared in the following manner. A 29% ammonium hydroxide solution is added drop-wise to a solution of 250 grams of silver nitrate dissolved in 450 ml. of water to form the complex $(Ag(NH_3)_2)^+$ until the precipitated silver oxide starts to dissolve in the excess ammonium hydroxide, the end being a straw yellow color of said precipitate. Water is then added to the solution to provide a total volume of 4 liters. The silver is then precipitated from the solution onto the pre-silvered nickel powder by the addition of a reducing solution, as for example, a 4% aqueous solution of formaldehyde. Because part of the silver is precipitated on the walls of the reaction vessel, the pre-silvered nickel powder is coated in a stepwise fashion beginning with highly diluted silvering solutions. The amount of silver lost by such deposition on walls during the reaction in this manner may be kept relatively small. In this first reaction step an additional number of preferred growing centers are created on the pre-silvered grain surface to maintain growth at these preferred growing centers for the further deposition in the following silvering steps. Table I illustrates a typical concentration and times for the stepwise silvering described, with the silvering solution and the reducing agent solution added alternately.

TABLE I

| Step | Silvering Soln. (ml.) | $H_2O$ Added (ml.) | Red. Soln (ml.) | Reaction Time (min.) |
| --- | --- | --- | --- | --- |
| 1 | 50 | 2,000 | 50 | 10 |
| 2 | 50 | 2,000 | 50 | 10 |
| 3 | 400 | 1,600 | 300 | 12 |
| 4 | 500 | 1,500 | 700 | 10 |
| 5 | 1,000 | 1,000 | 800 | 15 |
| 6 | 2,000 | | 1,100 | 10 |

Following this treatment the coated powder is washed and dried.

By way of example of another method of chemically reducing a highly catalytically active coating of silver on a pre-silvered substrate, finely divided silver coated nickel particles were poured into a solution of carbon disulphide having dissolved therein phosphorous. The mixture was then stirred and the pre-silvered particles permitted to settle out. The excess phosphorous-carbon disulphide solution was then decanted off and the remaining solution evaporated in an inert atmosphere, leaving a fine homogeneously distributed coating of phosphorous on the pre-silvered nickel particles. This operation was carried out in an inert atmosphere to avoid the oxidation of phosphorous by air. A silvering solution comprising 100 ml. of 0.1 normal silver nitrate solution was then added to the dry phosphorous impregnated pre-silvered nickel powder and vigorously stirred. Once again, this operation was carried out in an inert atmosphere. This resulted in an almost instantaneous precipitation of a black silver coating of chemically reduced silver on the pre-silvered powder which was then washed in carbon disulphide to remove any unreacted phosphorus, following which the dual coated powders were washed in water to remove any excess silver salt therefrom. The powder was then dried in air at a slightly elevated temperature. This method of reducing a catalytically active layer of metal by the use of a finely, homogeneously deposited layer of phosphorous on a substrate particle is described in more detail and claimed in a co-pending application Serial No. 219,424 of H. E. Hintermann, entitled "Method of Plating Metals" filed on even date herewith, assigned to the assignee of the present invention and now abandoned. As described in this application, this method is operable for depositing coatings of all metals more noble than phosphorus in the electromotive series. Specific examples of this process for other metals are recited therein.

Still another method for depositing a catalytic coating on a substrate by a chemical reduction technique is that described and claimed in U.S. Patent No. 2,915,406, issued December 1, 1959, to R. N. Rhoda and A. Madison. A typical example of such a coating, which is peculiarly adapted for the chemical reduction of palladium on a substrate, utilizes a plating solution comprising 5 grams per liter of a complex palladium salt $Pd(NH_3)_4Cl_2$, 280 grams per liter of ammonium hydroxide (29%) and 8 grams per liter of the disodium salt of EDTA. Initially, 8 ml. of 1 mol per liter hydrazine are added to 1 liter of the plating solution and the addition rate of the reducing agent kept at 8 ml. per hour. Under these conditions, the deposition rate of the palladium layer on a pre-coated nickel powder was at the rate of about 1 micron per hour, at 35° C.

The various plating methods described hereinbefore are illustrative only and the particular metals deposited on the particles and the amounts of the deposits are not necessarily those which provided the highest catalytic activity for fuel cell purposes. In this respect it should be understood that while the particular coatings described have been silver on silver and palladium on palladium that these metals were chosen to be illustrative only, inasmuch as they are known to be exceptionally good catalysts for promoting the reaction which takes place in fuel cells. Other metals also have high catalytic activity such as gold and the metals of the platinum group (ruthenium, rhodium, osmium, iridium, and platinum) in general, and the present invention is equally applicable to these materials. It also should be understood that for certain electrodes it may be desirable to plate the chemically reduced layer on another catalytic material not the same as the reduced layer, as for example, the plating of palladium on a silver coating applied by an exchange technique.

The superiority of the dual coated electrode materials in accordance with the present invention is illustrated by the curves of FIGS. 5 and 6. In each of these figures, performance characteristics are plotted for test fuel cell electrodes comprising porous sintered discs of coated nickel powders. The test electrodes were circular in shape having a geometrical surface area of 7 sq. cm. and were 0.3 cm. thick containing 7 grams of coated nickel powder pressed at 1500 p.s.i. and sintered for 1 hour in a hydrogen atmosphere at a temperature of from between 570° C. to 600° C. The electrodes were tested in 27% KOH vs. hydrogen at a temperature of 40° C. Referring specifically to FIG. 5, there is shown the performance of sintered oxygen electrodes in which the electrode polarization in volts vs. hydrogen is shown plotted as a function of the applied current density in milliamps per sq. cm. Each of the electrodes contained a coating of 10% by weight of silver. Electrode A comprised nickel powder having a 10% silver coating applied all by means of a chemical displacement technique. Electrode B comprised nickel powder having a 10% coating of silver applied by a chemical reduction technique. Electrode C comprised nickel powder having a 5% by weight coating of silver applied by a chemical displacement technique, plus a 5% outer coating of silver applied by a chemical reduction technique. As can be seen from the curves of FIG. 5, the dual coated powders of the present invention, those used in Electrode C, exhibited superior catalytic activity despite the fact that they contained no more silver catalyst than the Electrodes A and B.

Referring now to FIG. 6, there is shown the results of tests conducted on hydrogen electrodes comprising sintered nickel discs constructed as described hereinbefore in connection with the oxygen electrodes of FIG. 5, containing 1% of palladium catalyst. The Electrode A, was fabricated from nickel powder having a 1% palladium coating applied by a chemical displacement technique. In the case of Electrode B the 1% palladium was applied by the chemical reduction of U.S. Patent No. 2,915,406. As for Electrode C, the 1% palladium was applied 0.5% by means of a chemical displacement process and 0.5% by means of a chemical reduction process. Once again, the dual coated powders, those used in Electrode C, proved to be catalytically superior to the coated powders used in the Electrodes A and B, despite the fact that they contained the same amount of catalytic palladium.

As noted hereinbefore, it has been found desirable that 65% to 25% of the total catalyst deposited be deposited by the chemical reduction technique. With almost all catalyst coatings tested, it has been found that optimum performance is obtained when approximately 50% of the total catalyst is applied by a chemical displacement technique and 50% by a chemical reduction technique. Referring now to FIGS. 7 and 8 there are shown charts in which electrode potential in volts vs. hydrogen is plotted as a function of the percentage of catalyst applied by the displacement technique for various current densities. In both cases the remainder of the catalytic deposit has been made by a chemical reduction technique. Referring specifically to FIG. 7, there is shown the performance of oxygen electrodes with three specific current densities as the parameter. Once again, these electrodes comprised sintered nickel powders coated in accordance with the teachings of the present invention having 10% silver as the applied catalyst. As can be seen by referring to the curves, in each case optimum performance is achieved where approximately 50% of the catalyst is applied by the chemical displacement technique with the remainder being applied by a chemical reduction technique. The curves for each current density are remarkably similar in slope and shape and exhibit clearly the preferred range of from 65% to 25% of the total catalyst being applied by a chemical reduction process.

Referring specifically to FIG. 8, there is shown a similar set of curves with electrode potential in volts vs. hydrogen plotted as a function of the percentage of catalyst applied by a displacement technique for hydrogen electrodes utilizing a total amount of 1% palladium catalyst, again with three chosen current densities as the parameter. Again, all three curves exhibited similar slopes and illustrate the preferred ranges of catalyst deposition as well as the optimum range of approximately 50%. Still further, in regard to the total percentage of catalyst applied to a substrate particle, it should be noted that this will vary with the particular catalyst involved. In the case of silver, an optimum amount of the total applied catalyst has been found to be approximately 10%.

A lower total amount of catalyst gives less effective performance and a larger amount of catalyst does not provide an economically justifiable improvement in electrode performance. In the case of palladium, a similar effect has been noted with 1% being the minimum amount of catalyst which has to be applied for practical electrode performance. While a greater amount of applied palladium will improve electrode performance, it has been found that the gain is not commensurate with the cost of the added catalyst. Other catalytic materials such as gold, platinum, and other metals of the platinum group (ruthenium, rhodium, osmium, iridium, and platinum) have been found to exhibit distinct optimum ranges of performance. However, in the case of such other metals is is still preferred that 65% to 25% of the total catalyst be applied by the reduction process as an outer layer upon a 35% to 75% coating of the catalyst by a chemical displacement process.

In further considering the present invention it should once again be reiterated that the chemically reduced catalytic layer may be applied to a porous sintered plaque comprising sintered substrate particles coated with a first layer of catalytic material applied by the chemical displacement technique. While no specific examples have been given herein, it will be obvious to those skilled in the art that non-conductive substrates provided with a first conductive coating may be made catalytically active in accordance with the teachings of the present invention by depositing thereon the dual coatings in the manner discussed hereinbefore. In this respect, the dual coating process of the present invention may be applied to microporous plastic substrates such as microporous plastic sheets, as well as to individual particles. With such an electrode, the sintering step would, of course, be unnecessary. In this respect a typical substrate material may be microporous plastic or microporous plastic sheets such as polyethylene and polyvinyl chloride. Such a non-conductive substrate, of course, must first be made conductive by the application thereto of a conductive metallic coating of a metal non-corrosive in the medium and which will undergo an exchange reaction with the desired catalyst.

Having described the present invention, that which is claimed as new is:

1. A method for preparing a porous electrode which comprises depositing a first metallic catalyst coating on a metallic surface of a finely divided substrate by a chemical displacement technique, depositing on said first catalyst coating a second metallic catalyst coating by a chemical reduction technique, and subsequently fabricating the coated, finely divided substrate into a porous electrode and using said porous electrode in a fuel cell for the direct conversion of chemical energy into electrical energy by electrochemical means.

2. A method in accordance with claim 1 in which 65% to 25% of the total catalyst coating is deposited by a chemical reduction technique.

3. A method in accordance with claim 2 in which the metallic surface of the finely divided substrate is selected from the group consisting of nickel, silver, copper and cobalt.

4. A method in accordance with claim 2 in which the first and second metallic catalyst coatings are selected from the group consisting of silver, palladium, gold, platinum, ruthenium, rhodium, osmium and iridium.

5. A method in accordance with claim 4 in which at least one of the catalyst coatings is platinum.

6. A method in accordance with claim 4 in which at least one of the catalyst coatings is gold.

7. An electrode prepared in accordance with the method of claim 2.

8. A method for preparing a porous electrode which comprises depositing a first metallic catalyst coating on a metallic surface of a finely divided substrate by a chemical displacement technique, fabricating said coated, finely divided substrate into a porous electrode structure, and thereafter coating the porous electrode structure with a second metallic catalyst coating by a chemical reduction technique and using said porous electrode in a fuel cell for the direct conversion of chemical energy into electrical energy by electrochemical means.

9. A method in accordance with claim 8 in which 65% to 25% of the total catalyst coating is deposited by a chemical reduction technique.

10. A method in accordance with claim 9 in which the metallic surface of the finely divided substrate is selected from the group consisting of nickel, silver, copper and cobalt.

11. A method in accordance with claim 9 in which the first and second metallic catalyst coatings are selected from the group consisting of silver, palladium, gold, platinum, ruthenium, rhodium, osmium and iridium.

12. A method in accordance with claim 11 in which at least one of the catalyst coatings is gold.

13. An electrode prepared in accordance with the method of claim 9.

14. A method for preparing a porous electrode which comprises depositing a first metallic catalyst coating on a metallic surface of a porous substrate by a chemical displacement technique, depositing a second metallic catalyst coating on said first metallic catalyst coating by a chemical reduction technique, and using said catalyst coated, porous substrate as an electrode in a fuel cell for the direct conversion of chemical energy into electrical energy by electrochemical means.

15. A method in accordance with claim 14 in which 65% to 25% of the total catalyst coating is deposited by a chemical reduction technique.

16. A method in accordance with claim 15 in which the metallic surface of the finely divided substrate is selected from the group consisting of nickel, silver, copper and cobalt.

17. A method in accordance with claim 15 in which the first and second metallic catalyst coatings are selected from the group consisting of silver, palladium, gold, platinum, ruthenium, rhodium, osmium and iridium.

18. A method in accordance with claim 17 in which at least one of the catalyst coatings is platinum.

19. A method in accordance with claim 17 in which at least one of the catalyst coatings is gold.

20. An electrode prepared in accordance with the method of claim 15.

References Cited by the Examiner

UNITED STATES PATENTS

| | | | |
|---|---|---|---|
| 2,646,456 | 7/1953 | Jacquier | 136—28.11 |
| 2,646,457 | 7/1953 | Jacquier | 136—29 |
| 2,694,100 | 11/1954 | Zahn | 136—19 |
| 2,834,825 | 5/1958 | Wenzelberger | 136—75 |
| 2,865,973 | 12/1958 | Hartman et al. | 136—20 |
| 3,101,285 | 8/1963 | Tantram et al. | 136—75 |
| 3,110,622 | 11/1963 | Hipp | 136—120 |
| 3,117,034 | 1/1964 | Tirrell | 136—120 |

FOREIGN PATENTS 626,767  9/1961  Canada.

OTHER REFERENCES

Saubestre: "Electroless Plating Today," Metal Finishing, June 1962, pp. 67–73.

Wesley: "Nickel Immersion Coatings by Electrochemical Displacement and by Chemical Reduction," Plating, July 1950, vol. 37, TS670A3, pp. 732–734 and 756.

JOHN H. MACK, *Primary Examiner.*

W. VAN SISE, *Assistant Examiner.*